(12) United States Patent
Guillemaud

(10) Patent No.: US 6,449,388 B1
(45) Date of Patent: *Sep. 10, 2002

(54) METHOD FOR ALIGNING AN OBJECT WITH AN IMAGE CAPTURE APPARATUS AND A COUPLING EYEPIECE

(75) Inventor: Régis Guillemaud, Grenoble (FR)

(73) Assignee: Commissariat a l'Energie Atomique, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,006

(22) Filed: Mar. 8, 1999

(30) Foreign Application Priority Data

Mar. 16, 1998 (FR) .............................. 98 03185

(51) Int. Cl.$^7$ ................................ G06K 9/00
(52) U.S. Cl. ................. 382/154; 382/287; 382/284; 348/42; 345/629; 356/12
(58) Field of Search ................. 382/294, 295, 382/291, 151, 154, 284, 287; 396/96, 104, 109, 111; 348/42, 47; 356/12, 301; 345/629, 630, 635

(56) References Cited

U.S. PATENT DOCUMENTS

| 4,201,456 A | * | 5/1980 | Wolbarsht .................. 353/101 |
| 4,500,189 A | | 2/1985 | Aoki |
| 4,575,626 A | | 3/1986 | Oinoue et al. |
| 5,493,362 A | * | 2/1996 | Nonaka ...................... 354/403 |
| 5,673,334 A | * | 9/1997 | Nichami et al. ............ 382/143 |
| 5,943,514 A | * | 8/1999 | Sato et al. .................... 396/96 |
| 5,978,521 A | * | 11/1999 | Wallack et al. ............. 382/294 |

* cited by examiner

Primary Examiner—Bhavesh Mehta
Assistant Examiner—Yosef Kassa
(74) Attorney, Agent, or Firm—Oblon, Spivak, McClelland, Maier & Neustadt, P.C.

(57) ABSTRACT

The present invention relates to a method for aligning an object, whose image is to be recorded, with an image capture apparatus and a coupling eyepiece. Said method consists in using a light source, said light source being positioned in the place of the object and emitting luminous dots through a mask and through the coupling eyepiece towards the capture apparatus. The invention also consists in verifying whether the images of said luminous dots are split into two on the image plane, then, using all the development functions determined for the various alignment settings, in determining a particular setting in which the distances between the images of the luminous dots are minimal.

5 Claims, 2 Drawing Sheets

METHOD FOR ALIGNING AN OBJECT WITH AN IMAGE CAPTURE APPARATUS AND A COUPLING EYEPIECE

FIELD OF THE INVENTION

The present invention relates to a method that uses a coupling eyepiece and an image capture apparatus to align an object whose image is to be recorded in order to produce an optimal quality shot.

The invention may have applications in any sectors concerned with the creation of optimal quality images, particularly in the field of astronomy and in the medical sector and more particularly for X-ray shots.

BACKGROUND ART

In the field of image capture, specialists in the field attempt to achieve images of the highest quality possible, in other words with satisfactory focussing of the capture system and the best possible image definition.

In order to obtain an image of excellent quality, the image plane, i.e. the plane in which the image capture apparatus lies, must be perfectly aligned with the coupling eyepiece on the one hand and with the object on the other. However, the alignment is difficult to effect as the orthogonality of the image plane must be adjusted according to the optical axis and to the focal distance.

Also, in order to create images of an object on an image plane through a welding eyepiece it is necessary to obtain optimal positioning between the object, the eyepiece and the image plane. The optimal positioning can be achieved by means of settings that are usually made between the positions of the eyepiece and the capture system (i.e. the image plane). The object is generally positioned so that it is fixed. There are two kinds of settings:

a setting, by means of rotation, of the perpendicularity of the image plane in relation to the optical axis of the eyepiece; and a setting of the image plane position i.e. the capture apparatus, in relation to the eyepiece; this is the standard type of focus setting used in an ordinary camera. The setting is made by means of a translation movement along the optical axis, and enables the plane of the capture apparatus or the image plane to be focused on the object plane.

Generally, the object is at a variable distance from the eyepiece. The eyepiece/image plane setting can therefore be made either approximately or visually by the operator using range finding or reflex means.

Some image recording or capture apparatuses are equipped with a system for measuring the object/eyepiece distance that measures the distance between the object and the eyepiece using an ultrasound or infrared method. In this technique the eyepiece/image plane setting is made automatically.

However, in these standard apparatuses, the depth of field at the eyepiece is significant. The eyepiece/image plane setting is therefore not always accurate.

Moreover, applications exist in which the eyepiece/image plane setting is finer, for example in electron microscopy. In electron microscopy the operator can adjust the eyepiece/image plane setting visually. The operator can also make the setting using a technique known as the "wobber focusing aid". The technique is described on pages 29 to 31 of "The Principles and Practice of Electron Microscopy" by Ian M. Watt (Cambridge University Press). This technique consists in oscillating a luminous beam between two positions in relation to the lens of the image recording apparatus. This produces a double response of the object observed on the image plane until the system reaches optimal focusing.

However, these "wobbling" methods are difficult to implement as it is not easy to deflect the light source.

In astronomy, it is also useful to have fine setting, particularly when a CCD camera is used in combination with an astronomic eyepiece as described in the article "Une Mission Haute Résolution au T60" (A High Definition Assignment at T 60) by J. Dijon et al., published in Pulsar magazine No. 707, March–April 1995. The article describes a method that enables a relatively sensitive eyepiece/image plane setting to be achieved. The method consists in selecting a single star, positioning a two-holed mask at the entry of the astronomic eyepiece and verifying the number of patches of light that appear on the CCD image recording apparatus. If the CCD camera is not correctly focused in relation to the eyepiece, two patches appear on the camera. If, however, the focusing is correct only a single patch appears on the CCD image recording apparatus. By displacing the projection of the star over different areas of the CCD camera, the alignment of the eyepiece/CCD camera can be adjusted, in other words it is possible to adjust the alignment between the eyepiece and the image plane.

However, this method can only be used for an object located at infinity, as is the case in astronomy.

Other optical methods enable the orthogonality of the image plane with the optical axis to be adjusted. One method consists in using an autocollimation eyepiece that is placed on the entry of the eyepiece. In this example, the image plane must provide a reflection for this kind of setting. Moreover, difficulties may arise when other reflective planes are present on the trajectory between the eyepiece and the image plane, as is the case in a CCD camera being used through a glass window.

A method of this kind therefore proves difficult to put into operation. Also, this method only provides the setting required for surface evenness, it does not provide the setting for focusing required to align the system.

DISCLOSURE OF THE INVENTION

The aim of the invention is to overcome the drawbacks of the techniques described above. In order to do this, the invention provides a method for aligning an object, of which an optimal quality shot is to be taken, with an image capture apparatus and a coupling eyepiece. This method consists in using a light source that is positioned in the place of the object and that emits luminous dots through an opaque mask, perforated with at least two holes, and through the coupling eyepiece in the direction of the capture apparatus. The method also consists in verifying whether the images of the luminous dots are split into two on the image plane of the capture apparatus.

More precisely, the invention relates to a method for aligning an object whose image is to be recorded with an image capture apparatus and a coupling eyepiece. This method is characterized in that it consists in:

defining an object plane emitting at least three luminous dots in the object plane;

positioning an opaque mask perforated with at least two holes in the optical path;

effecting a plurality of image captures of the luminous dots, each image capture being made for a different alignment setting, using known parameter settings;

producing a list of distances between the images of the luminous dots on the image plane that is defined by the capture apparatus, said list being produced for each luminous dot and each alignment setting;

determining a development function of the distance between luminous dots for each luminous dot and each alignment setting; and determining a particular setting for which the distances between the images of the luminous dots are minimal that is based on all the development functions for the various alignment settings.

Advantageously, the parameter settings comprise a translation movement parameter and two rotation parameters that move in a direction parallel to the optical axis and the coupling eyepiece.

The parameter settings can also include a fourth parameter that is relative to the overall translation movement of the image plane along the optical axis.

In one embodiment of the invention, the method consists in emitting three luminous dots and effecting at least four image capture operations of the luminous dots fore four different alignment settings.

In another embodiment of the invention, when the number of luminous dots is greater than 3, the method consists in pre-selecting those luminous dots that are to be included in the subsequent stages of the method of the invention.

DETAILED DESCRIPTION OF EMBODIMENTS OF THE INVENTION

The invention relates to a method for aligning an object whose image is to be recorded with an image capture apparatus and a coupling eyepiece.

Throughout the description that follows, reference will be made to the "image plane" and the "object plane":

the image plane, referred to as Pi in the figures, is the plane in which the image of the object is formed in the image recording apparatus (or the image capture apparatus);

the object plane, referred to as Po in the figures, is the plane in which the object lies at the time the shot is taken. It should be noted, however, that the method of aligning these planes is implemented without the object being present; no object is required to perform the alignment, only the object plane i.e. the plane in which the object will lie when the shot is taken, is used to implement the method. During alignment the object plane is defined either virtually or materially by the support on which the object will later be placed when the image is recorded.

It should be noted, moreover, that throughout the setting up of the alignment method, and during the shot itself, the coupling eyepiece (more simply called "the eyepiece") focuses on the object plane.

According to the method of the invention, the alignment of the image capture apparatus (in other words the object, the coupling eyepiece and the capture apparatus) is successively achieved using several luminous dot images emitted by a light source through an opaque mask perforated with at least two holes, such as that described in the patent application filed today by the present applicant and entitled "System for Determining and Quantifying the Alignment of an Object with a Coupling Eyepiece and an Image Recording Apparatus". The image of each of these luminous dots is either a single dot, in which case the alignment of the system is considered to be achieved, or a dot split into two, in which case there is considered to be no alignment of the system. Where a dot is split into two, the method of the invention consists in determining the optimal setting of the elements of the system in relation to each other (i.e. the coupling eyepiece, the object plane and the image capture apparatus), using the distance that separates the two dots (or patches) of a dot split into two.

Figure 1:
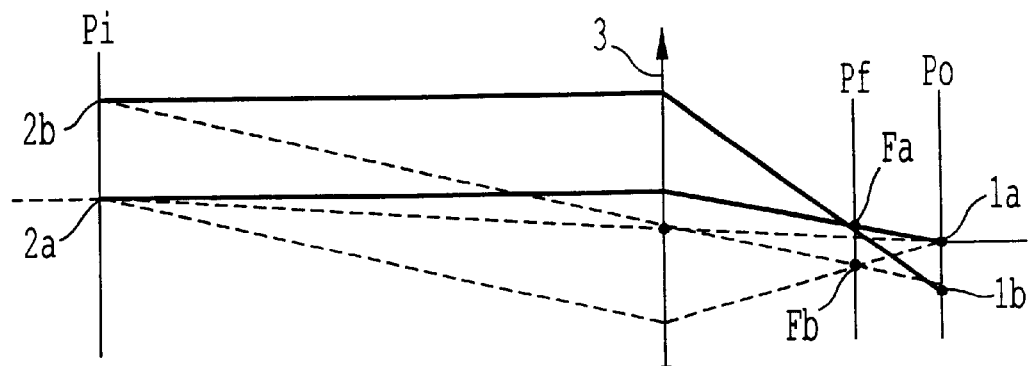
FIG. 1 is a diagram of the optical trajectory of the luminous dots from the object plane to the image plane.

To enable the method of the invention to be fully understood, FIG. 1 shows the optical trajectory of two luminous dots $1a$ and $1b$ that are emitted by the light source. The two luminous dots $1a$ and $1b$ are projected as $2a$ and $2b$ onto the image plane Pi, in other words on the image capture apparatus, along an optical path through coupling eyepiece 3.

The example in FIG. 1 shows an aligned image capture apparatus i.e. a system in which the image capture apparatus is aligned with eyepiece 3 and with the object plane Po shown during the method to align it with the light source. The alignment is correct because the beams that are emitted from points $1a$ and $1b$ of the object plane converge towards a single point on image plane $2a$ and $2b$. In FIG. 1 it may be noted that the incident beams of light that are parallel to the optical axis of the coupling eyepiece 3, shown by unbroken lines, all pass through the focal point Fa. It may also be noted that the incident beams that are oblique and parallel to each other and shown by dotted lines in FIG. 1, pass through a different single focal point Fb. Therefore, both focal points Fa and Fb of focal plane Pf correspond to a direction of incident beams.

Luminous dot $1a$ that passes through focal points Fa and Fb will now be considered. Providing that the capture apparatus 2 is correctly positioned in relation to coupling eyepiece 3 and to object plane Po, in other words providing these three elements are aligned, the image of luminous dot $1a$ is then point $2a$. The image of the luminous dot is a single point.

However, if the capture apparatus is badly focused i.e. if these three elements are not aligned, the image of luminous dot $1a$ then comprises two dots (or patches) on the capture apparatus, in other words a dot that is split into two. In this situation, the distance between the two patches of the split dot is in proportion to the focusing distance of the capture apparatus. This distance, and at least two other distances that are determined identically for other settings of the system, are used to determine the optimal setting of the system and particularly the optimal focusing position of the capture apparatus.

In other words, the aim of the method of the invention is to characterize and calibrate the distance between two patches or images of the same luminous dot relative to the focusing of the capture apparatus, said method being used when the capture apparatus, the coupling eyepiece and the object plane have been correctly defined.

If then, the distance between two patches of a double dot is referred to as Dpoint and the distance between the eyepiece and the capture apparatus is referred to as Deyepiece, the following equation can be written:

$$D_{point} = a * D_{eyepiece} + b,$$

this function being cancelled when the optimal focus of the capture apparatus is determined.

The alignment method of the invention consists in an initial stage 6 of defining an object plane by choosing apposition where the object whose image will be recorded is later placed, said position also being occupied by the source of luminous dots when the method is implemented.

The method consists in then emitting luminous dots in the object plane in the direction of the image plane (stage 8). There are a minimum of three luminous dots. Advantageously, more than three luminous dots are used to ensure a high degree of accuracy in the method and a relatively short processing time.

The subsequent stages of the method of the invention can be carried out according to two different embodiments.

Figure 2:
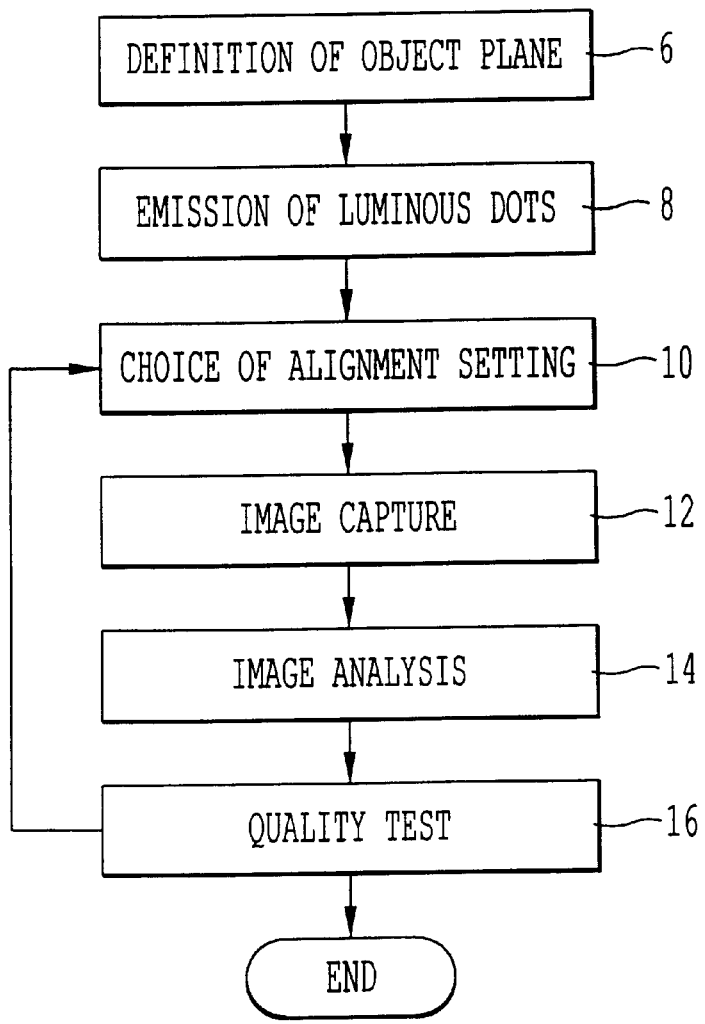
FIG. 2 is a functional diagram of the method of the invention in a first embodiment.

The first embodiment is schematically shown in FIG. 2.

According to this first embodiment the subsequent stages of the method are carried out iteratively. In this embodiment the method initially comprises a stage 10 that provides a choice of alignment settings. An "alignment setting" comprises focusing of the capture apparatus on the one hand, and positioning of the coupling eyepiece and positioning of the capture apparatus on the other. Positioning of the object plane is defined at the beginning of the method and remains fixed for the rest of the method and for the shots of the object.

Therefore setting of the system is achieved using:
  rotation to adjust the evenness of the capture apparatus in relation to the coupling eyepiece; and
  a translation movement along the optical axis in order to adjust the focus.

The setting is chosen randomly for the first operation. Subsequent settings are chosen according to information collected at the end of previous operations (in other words at stage 16) depending on the quality of alignment obtained.

The method continues with step 12 that consists in capturing the image of the luminous dots on the image plane for the alignment setting chosen at stage 10.

A stage 14 then consists in analyzing the image of the dots. During the analysis it is determined whether the image of a single dot is single or double; if the image is double, the distance between the two images of the luminous dot i.e. between the two patches that constitute the double dot, is calculated in order to establish what setting of the elements of the system must be applied to improve the alignment of said elements.

A stage 16 then consists in a quality test used to verify the quality of the alignment thus obtained during analysis stage 14. If the quality is satisfactory, optimal setting is considered to be achieved i.e. the setting required to obtain minimal distances between the images of luminous dots.

If this is not the case, the method is repeated from stage 10 during which a new alignment setting is chosen depending on the result of quality test 16.

Figure 3:
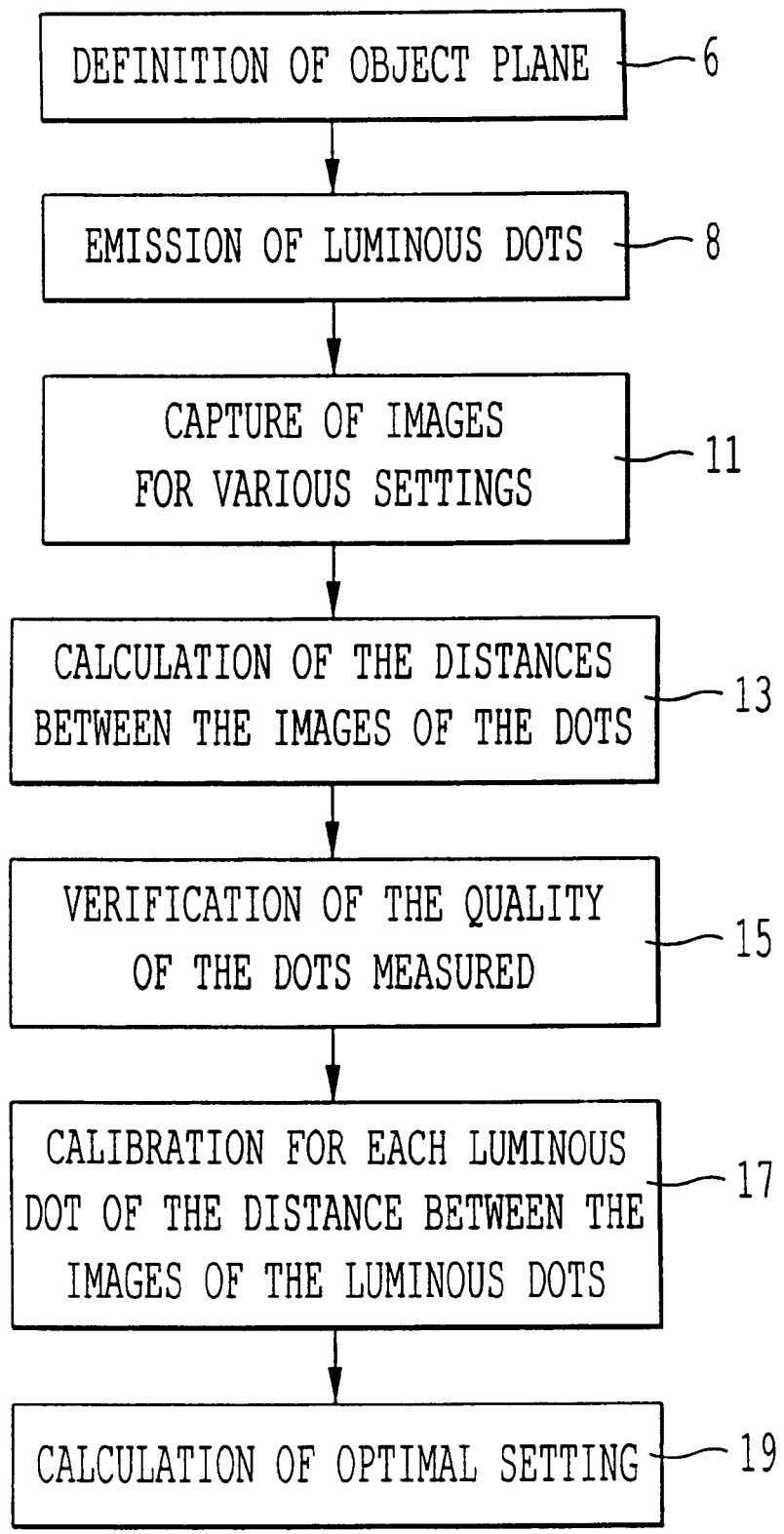
FIG. 3 is a functional diagram of the method of the invention in a second embodiment.

FIG. 3 schematically shows the method of the invention according to a second embodiment. In addition to stage 6 that defines the object plane and stage 8 that emits luminous dots in the object plane, the method of the invention comprises a stage 11 for capturing the images of the luminous dots (or luminous patches) using the capture apparatus. According to this embodiment of the invention an image of each of these luminous dots is made for each setting of the system. These image captures are made simultaneously or successively for various alignment settings.

The method of the invention then comprises a stage 13 that consists in calculating the distances between the images of the luminous dots i.e. between the impact patches of each luminous dot, when the dot is split into two. The distances may be calculated in a number of ways; for example, for every luminous dot on the object plane a sub-image can be defined in the capture apparatus in which the image of the luminous dot is to be projected. The luminous patches can then be positioned, for example, by calculating the center of gravity of each patch.

Another method of calculation consists in performing a gaussian estimation on each of the patches that thus enables the distribution of the levels of gray in the sub-image containing the images to be modeled satisfactorily. This estimation can be made using an Expectation Maximisation-type algorithm such as that given in the article "Parameter Estimation and Tissue Segmentation from Multispectral MR Images" by Z. Liang et al., IEEE Trans. Med. Im, vol. 13, No. 3, September 1994.

The method of the invention may then comprise a stage 15 for verifying the quality of the dots measured. This stage is not necessary for the method to be satisfactorily achieved but it does, however, improve the quality of the result. This stage consists in verifying that the behavior of the various luminous dots is coherent. For example, if two or three translation movement settings have been made in stage 11, stage 15 consists in ensuring that the behavior is the same for all the luminous dots; therefore luminous dots that may appear aberrant during this stage are eliminated and are not used in the subsequent stages.

The method then consists in a calibration stage 17 for each of the luminous dots. This stage 17 provides the information needed to determine the optimal alignment for the system in stage 19. Calculation of the optimal setting consists in minimizing all the distances between the images of the luminous dots in relation to alignment setting parameter of the image plane.

Stages 17 and 19 can be implemented using mathematical methods that will be described further on. In particular, stages 17 and 19 each consist in solving opposite systems of equations.

It should be noted that the image plane of the capture apparatus is constituted by a plane that is defined by three setting points. Optimal focusing of the capture apparatus is achieved when the plane is perpendicular to the to the optical axis and at the correct focusing distance. Setting of the position of the plane is therefore made by positioning the three setting points that define it.

Therefore, the position of these three setting points defines how the system must be adjusted. In other words, the three points set the parameters of the translation movement and the rotation that are needed to align the system. Preferably, these three points move in a direction parallel to the optical axis and the parameters of the points are set by defining their position on the line along which the system moves. This line is advantageously parallel to the optical axis of the lens. A point of origin is randomly defined on each line and remains immobile throughout alignment.

For each luminous dot of the light source a distance between the dots (i.e. the distance between the two patches that are images of the luminous dots on the capture apparatus) is defined. The positions of the setting points are referred to as D1, D2 and D3 along the axis of displacement of the system; there exists therefore a linear relation:

$$Dpoint = a1*D1 + a2*D2 + a3*D3 + b.$$

For each luminous dot a calibration can therefore be calculated as a function of the distance Dpoint as a function of the values of D1, D2 and D3. In order for this to be achieved different image capture apparatuses are used that are intended for different settings, a distance $Dpoint_i$ being associated with each setting. The following equation system can therefore be written:

$$Dpoint_1 = a1*D1_1 + a2*D2_1 + a3*D3_1 + b$$
$$Dpoint_2 = a1*D1_2 + a2*D2_2 + a3*D3_2 + b$$
$$\vdots$$
$$Dpoint_n = a1*D1_n + a2*D2_n + a3*D3_n + b,$$

in which the unknowns are a1, a2, a3 and b.

This system can be inverted using known mathematical methods such as the pseudo-inversion function of the MATHEMATICA™ software, or using the methods described on pages 52–60 of "Numerical Recipes, the Art of Scientific Computing", by W.H. Press et al. (Cambridge University Press). It should, however, be noted that in order to find a solution to this system it is necessary for the series of settings to include at least three independent linear settings.

After all these points have been calibrated, the following equations are therefore obtained:

$$Dpoint_{pt1} = a1_{pt1}*D1 + a2_{pt1}*D2 + a3_{pt1}*D3 + b_{pt1}$$
$$Dpoint_{pt2} = a1_{pt2}*D1 + a2_{pt2}*D2 + a3_{pt2}*D31 + b_{pt1}$$
$$\vdots$$
$$Dpoint_{ptn} = a1_{ptn}*D1 + a2_{ptn}*D21 + a3_{ptn}*D31 + b_{pt1}$$

In this system the variables are Dpoint, D1, D2 and D3.

The optimal solution of this system corresponds to a Distance Dpoint that is equal to 0 for all the luminous dots used to put implement the method (Dpoint=0: no image splitting of the luminous dots).

As seen above, setting of the system is achieved using rotation in order to adjust the evenness of the capture apparatus in relation to the coupling eyepiece and using a translation movement along the coupling eyepiece axis to adjust the focus of the capture apparatus. However, in this second embodiment of the invention the parameters for all the rotation and translation movements are set by the position of the three setting points that define the image plane. Therefore, an identical movement of the three setting points enables a translation movement and different settings to be made according to the three setting points used for rotation.

According to another version of the invention, positioning of the capture apparatus can be defined using a fourth parameter; this parameter is an overall translation movement of the image plane along the optical axis that is equivalent to a direct focus setting of the eyepiece. In this version the fourth parameter is referred to as D4 and the linear relation is as follows:

$$Dpoint=a1*D1+a2*D2+a3*D3+a4*D4+b$$

The method used to find the optimal setting is equivalent to that in the embodiment described above that comprises, however, five shots used for five different alignment settings.

When a great number of luminous dots are emitted by the light source the method of the invention can comprise an additional stage that consists in choosing the luminous dots that are to be used to implement the method. This stage is implemented immediately after the luminous dots are emitted during stage 8.

In order to ensure a higher definition quality of the system, additional processing may be added during stage 19 used to calculate the optimal setting:

in the image captures effected during stage 11 a series of image captures called "SP" is made for identical setting variations called "VD" on all the D1, D2 and D3 setting coefficients; this therefore corresponds to translation movements along the optical axis;

in a sub-stage that exists between stage 11 and stage 13, verification is made to ensure that all the differences in spacing between the patches are small. For luminous dots with small spacing differences a mean spacing difference ΔD is calculated for each setting variation VD i.e. const=mean (ΔD/VD);

the following requirement can therefore be added to the definition of the system: a1+a2+a3=const.

What is claimed is:

1. Method for physically aligning an image capture apparatus and a coupling eyepiece with an object whose image is to be recorded with the image capture apparatus and the coupling eyepiece, the method comprising:

defining an object plane;

emitting at least three luminous dots in the object plane;

positioning an opaque mask perforated with at least two holes in an optical path between the image capture apparatus, the coupling eyepiece, and the object to pass at least two luminous dots;

capturing a plurality of images of luminous patches produced by the luminous dots at a plurality of alignment settings having known setting parameters;

determining distances between the luminous patches of respective luminous dots in each said image for the plurality of alignment settings;

generating an equation system including:

$$Dpoint_1 = a_1*D1_1 + a_2*D2_1 + a_3*D3_1 + b$$
$$Dpoint_2 = a_1*D1_2 + a_2*D2_2 + a_3*D3_2 + b$$
$$\vdots$$
$$Dpoint_n = a_1*D1_n + a_2*D2_n + a_3*D3_n + b$$

wherein $a_1$, $a_2$, $a_3$ and b are unknowns, and D1, D2 and D3 represent positions of setting points along an axis of displacement; and solving said system to determine an alignment setting for which the distances between the luminous patches are minimal.

2. Method of claim 1, wherein the capturing step includes the setting parameters including at least one of a translation movement parameter and two rotation parameters for movement in a direction parallel to an optical axis of the coupling eyepiece.

3. Method of claim 2, wherein the capturing step includes the setting parameters including a fourth parameter relating to overall translation movement of an image plane of the image capture apparatus along the optical axis.

4. Method of claim 1, further comprising:

emitting three luminous dots; and capturing at least four images of said luminous dots at the plurality of alignment settings.

5. Method of claim 1, further comprising:

when a large number of the luminous dots is emitted, pre-selecting the luminous dots from the large number to be used in the steps of capturing, determining a distance, generating, and determining an alignment setting.

* * * * *